United States Patent [19]

Mandeville et al.

[11] Patent Number: 4,938,381
[45] Date of Patent: Jul. 3, 1990

[54] METHOD AND APPARATUS FOR DISPENSING A FOAM PRODUCT

[75] Inventors: David C. Mandeville, Canton; David W. Lazar, Garden City, both of Mich.

[73] Assignee: Kent-Moore Corporation, Warren, Mich.

[21] Appl. No.: 239,515

[22] Filed: Sep. 1, 1988

[51] Int. Cl.$^5$ .............................................. B29B 13/02
[52] U.S. Cl. ...................................... 222/1; 222/135; 222/146.2; 425/4 C; 264/41
[58] Field of Search ...................... 222/135, 146.1, 145, 222/255, 333, 340, 146.6, 146.2; 425/4 C, 87 C, 144; 239/128, 130; 118/130, 131.1; 264/41, 50

[56] References Cited

U.S. PATENT DOCUMENTS

| | | | |
|---|---|---|---|
| 4,059,466 | 11/1977 | Scholl et al. | 156/78 |
| 4,059,714 | 11/1977 | Scholl et al. | 428/310 |
| 4,204,612 | 5/1980 | Schrader et al. | 222/40 |
| 4,211,523 | 7/1980 | Hunerberg | 425/4 C |
| 4,230,934 | 10/1980 | ter Beek et al. | 425/144 X |
| 4,244,897 | 1/1981 | Moon | 425/144 X |
| 4,424,287 | 1/1984 | Johnson et al. | 264/50 X |
| 4,469,651 | 9/1984 | Hahn et al. | 264/50 X |
| 4,505,406 | 3/1985 | Cobbs et al. | 222/135 |
| 4,592,690 | 6/1986 | Busch | 413/19 |
| 4,621,678 | 11/1986 | Hahn et al. | 425/144 X |

FOREIGN PATENT DOCUMENTS 0223519 5/1987 European Pat. Off. .

Primary Examiner—Michael S. Huppert
Attorney, Agent, or Firm—Barnes, Kisselle, Raisch, Choate, Whittemore & Hulbert

[57] ABSTRACT

A method and apparatus for dispensing a foam product, wherein an elastomeric base material, which is solid at ambient temperatures, and a liquid material are combined to form a foam product, comprising heating the base material to melt the material, heating the liquid material to maintain the liquid at an elevated temperature above ambient, metering simultaneously portions of the base material and liquid material, mixing the portions, thereafter heat conditioning the mixture at a temperature above the melting temperature of the base material, subsequently conditioning the mixture to a lower temperature below that of the melting temperature of the base material and finally elevating the temperature of the mixture to about the melting temperature of the base material to provide a product suitable for use as a sealant such as a gasket. The temperatures and pressures of the materials throughout the dispensing are controlled thereby producing a uniformly consistent and repetitively formed foam product.

60 Claims, 2 Drawing Sheets

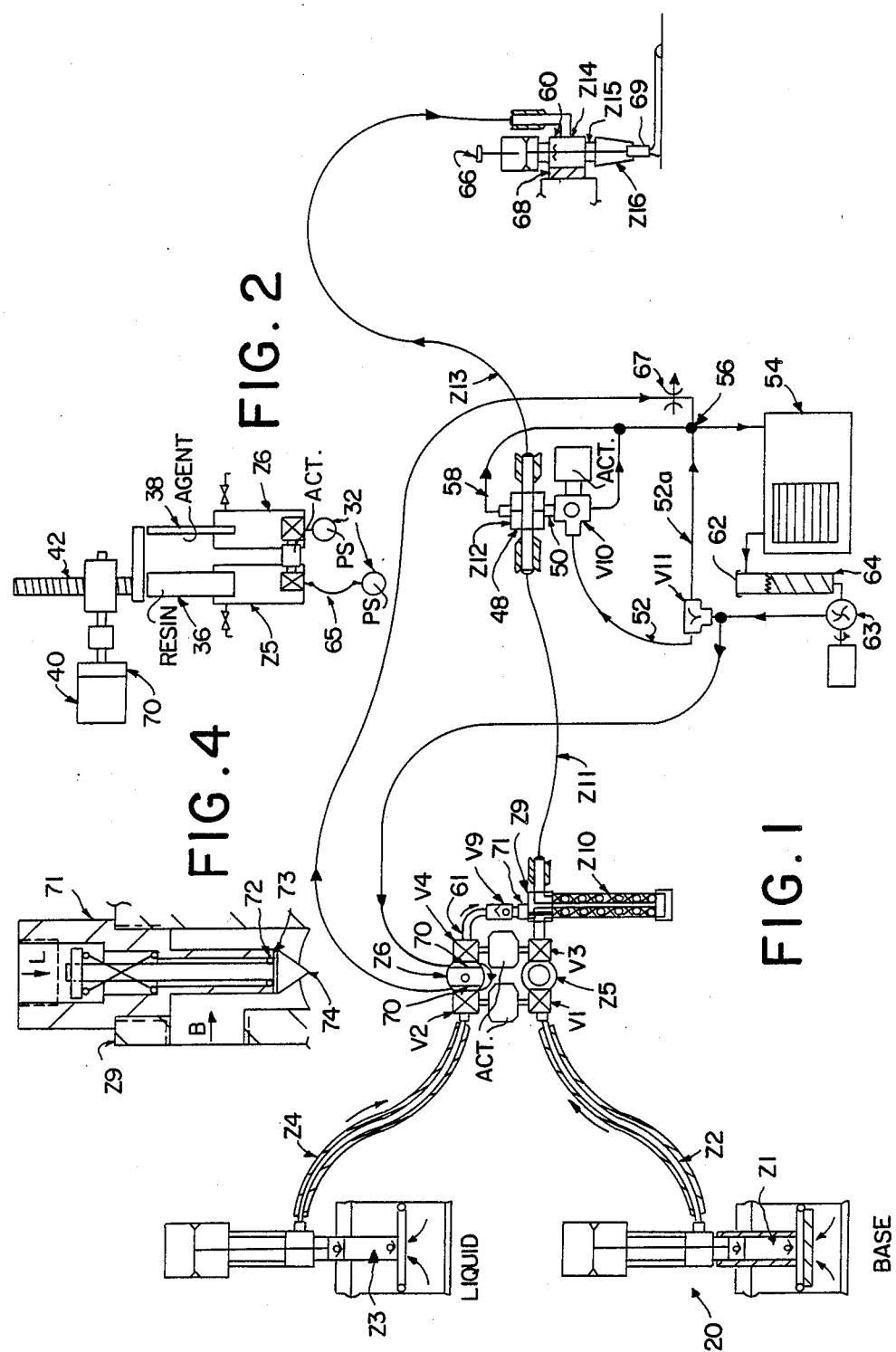

METHOD AND APPARATUS FOR DISPENSING A FOAM PRODUCT

This invention relates to making gaskets or seals by mixing and dispensing a foam sealant.

Background and Summary of the Invention

It is common to form gaskets or seals by cutting such seals from sheets of material, both solid and foam. Such a method is costly and involves waste. Efforts to make such gaskets or seals by mixing and dispensing materials have been found to be difficult to control in order to produce a satisfactory product.

In the mixing and dispensing of foam materials, it has been common to mix a foaming agent with a base material to provide a foam product. However, where the product is a sealant and it is desired that the product have substantial thermal deformation resistance, that is, not deform at elevated temperatures, the nature of the sealant precludes the direct mixing of a foaming agent and base material in an apparatus. Such a direct mixing would tend to obstruct the flow and soon result in an interruption of the mixing and dispensing.

In European Patent Application No. 0,223,519 A2 there is disclosed a method and apparatus for mixing and applying a foam sealant which comprises a thermoplastic base material which is solid at ambient temperatures and a liquid material containing reactive components such as a foaming agent. The solid base material is heated and delivered in a line to a first metering device. The liquid material is delivered at ambient temperature to a second metering device. The metering devices periodically deliver the hot molten base material and the liquid material through separate lines to a mixer where they are mixed and dispensed through a gun. The base material and a liquid material which, when mixed with a reactive component in the liquid material, will alter the total composition to yield desired physical characteristics in the foam product such as structural adhesion, high temperature retention and moisture resistance.

It has been found that such a method and apparatus will not produce a satisfactory foam sealant in a consistent and repetitive manner so as to enable the method and apparatus to be utilized commercially.

The patent to Scholl et al U.S. Pat. No. 4,059,714 discloses a method comprising melting a thermoplastic adhesive in an open top melting pot and then mixing air or an inert gas with a thermoplastic adhesive while the adhesive is in a liquid state and then increasing the pressure so as to force the gas into solution with the liquid adhesive. The solid thermoplastic adhesive is melted and then flowed by gravity to a pump where the gas is introduced to the inlet of the pump. A gear pump increases the pressure of the gas and molten adhesive mixture to force the gas into solution with liquid adhesive. The pump forces the mixture to a manifold block and hoses to a dispensing gun. Such a premature mixing and formation of the foam makes the handling thereafter difficult and produces problems in commercialization. In addition, where an inlet gas is introduced, it is difficult to control the required amount of inert gas in order that the resultant foam product has a consistent and homogeneous cell structure density.

Scholl et al U.S. Pat. No. 4,059,466 discloses a method which comprises heating a mixture of a solid thermoplastic adhesive and a powdered blowing agent in an open top melting pot to a temperature below the decomposition temperature of the blowing agent. Subsequently, the solid adhesive and blow agent are heated to a temperature above the melting point of the solid adhesive and above the decomposition temperature of blowing agent while pressurizing the mixture to form the gas generated into solution. Subsequently, the liquid adhesive is dispensed at atmospheric pressure and the gas is released. In such a method, the pressure not only must be increased to place the formed gas in solution but, in addition, the blowing agent must have a decomposition temperature above the melting temperature of the solid adhesive material. Otherwise, the foaming agent would immediately decompose during the premixing. This severely limits the method to blowing agents having such higher decomposition temperatures.

Cobbs U.S. Pat. No. 4,505,406 discloses a method comprising heating a liquid composition or resin with liquid blowing agents or solvents in a loop and pressurizing the mixture while the material is being circulated in the loop from which material is drawn for dispensing.

Busch U.S. Pat. No. 4,592,690 discloses mixing a synthetic rubber copolymer and plasticizer together with foaming or blowing agents and applying the hot composition to a cover or lid to form a gasket.

Accordingly among the objectives the present invention are to provide an improved method and apparatus which permits the formation of a foam product such as a sealant in a uniform consistent and repetitive fashion; which maximizes the foaming action; wherein the sealant has predetermined durometer and tensile strength; wherein the sealant will maintain a predetermined shape and cross section; which provides a sealant that will have a good foam bond with a substrate; which is substantially less costly than cut gaskets and seals; which permit the intermittent dispensing of the product; and which will permit the same apparatus to be readily adjusted for utilizing materials of different compositions.

In accordance with the invention, there is employed a method and apparatus for dispensing a foam product, wherein an elastomeric base material, which is solid at ambient temperatures, and a liquid material are combined to form the foam product which comprises heating the base material to melt the material, heating the liquid material to maintain the liquid at an elevated temperature above ambient, metering simultaneously portions of the base material and liquid material, mixing the portions, thereafter conditioning the mixture at a temperature above the melting temperature of the base material, subsequently conditioning the mixture to a lower temperature below that of the melting temperature of the base material and finally elevating the temperature of the mixture to about the melting temperature of the base material to provide a product suitable for use as a sealant such as a gasket.

Description of the Drawings

FIG. 1 is a schematic diagram of the method and apparatus for dispensing foam products embodying this invention;

FIG. 2 is a schematic view of a portion of the system shown in FIG. 1 taken in the direction of the arrow A;

FIG. 4 is a schematic view of the portion of the system shown in FIG. 1.

Referring to FIGS. 1 and 2 the apparatus embodying the invention comprises a device 20 that melts the solid elastomeric base material, and a pump Z1 that delivers the base material through a heated line Z2 and a valve V1 to a chamber Z5 of a metering apparatus M. A device Z3 delivers a liquid material containing a heat actuated foaming agent which is at above ambient temperature through a heated line Z4 and valve V2 chambers Z6 of a heated metering apparatus M. Valves V1, V3 are directly mounted on the metering chamber Z5 and valves V2, V4 are directly mounted on the metering Z6. The metering apparatus M includes pistons rods or displacement rods 36, 38 associated with the chambers Z5, Z6 and controlled by an electric motor 40 driving through a ball screw 42 to force the piston rods 36,38 simultaneously into the chambers Z5, Z6 and thereby dispense predetermined quantities of the base material and liquid material as required in the ratio desired. Outlet valves V3, V4 are associated with the respective chambers Z5, Z6.

Figure 3:
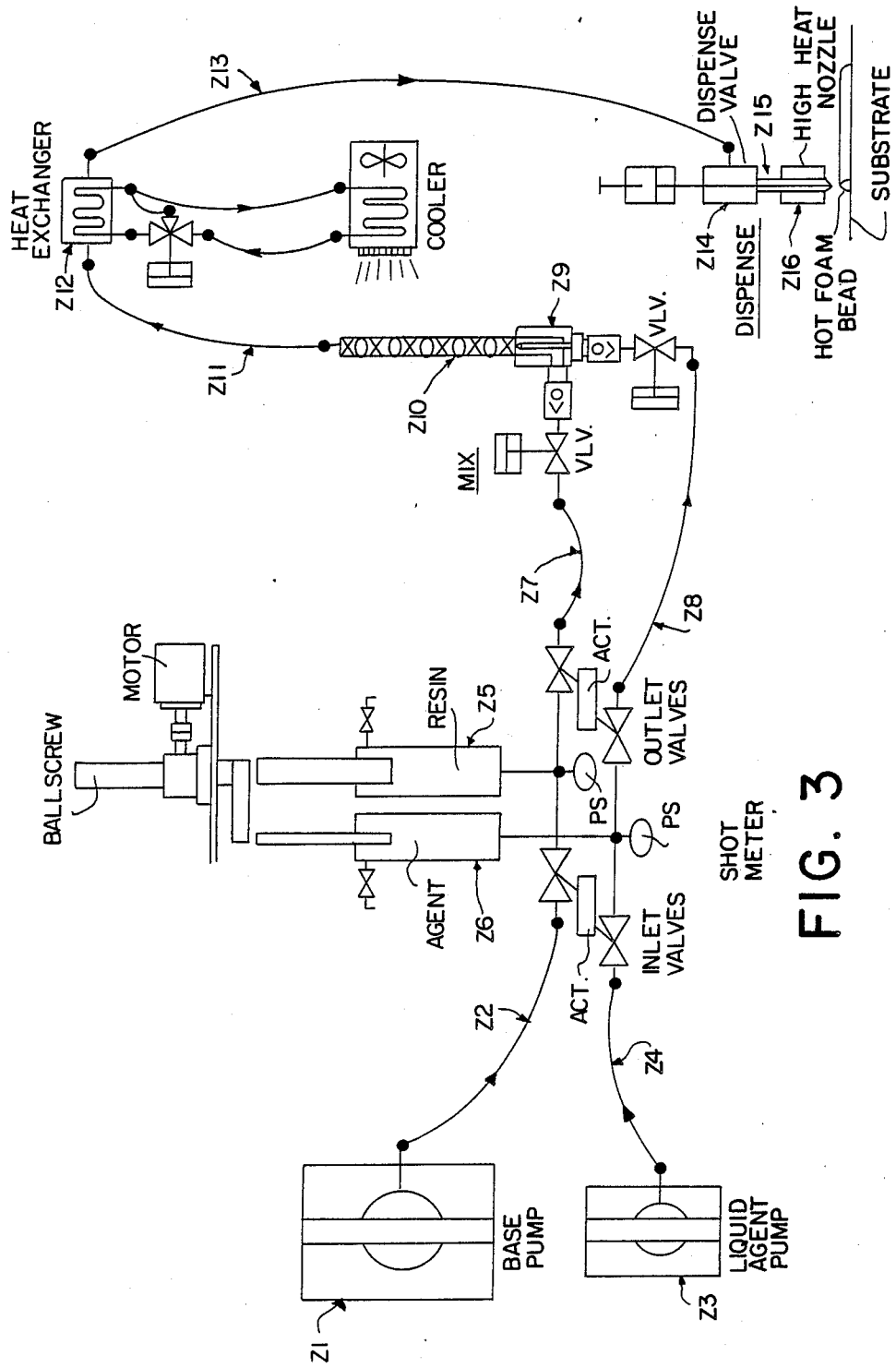
FIG. 3 is a schematic diagram of a modified method and apparatus.

A mixture block Z9 is directly mounted on the valve V3 and a line 61 extends from the valve V4 through a check valve V9 to the mixing block Z9. A mixer Z10 is directly mounted on the mixer block Z9 and is adapted to receive the mixture of the base material and liquid material and direct it through a heated line Z11 to a heated conditioning device Z12 that lowers the temperature and directs the mixture through a heated line Z13 to a heated valve Z14 through an unheated isolation zone Z15 to a heated dispensing nozzle Z16.

The conditioning apparatus Z12 includes a heat transfer block 48 where the heat transfer occurs. Cooling fluid flows from the block 48 through lines 58, 50 to a cooling device 54 from which the fluid flows to a reservoir 64 which is provided with a cap 62 so that the fluid in the reservoir 64 is under pressure. A cooling fluid pump 63 than directs the fluid to a throttling valve V11 which in turns directs a portion of the liquid through a line 52 to a control valve V10 and another portion of the fluid through a line 52a to the return line 56. The valve V10 directs the cooling fluid through a line 50 to the transfer block 48.

A portion of the cooling fluid may be directed to a heat exchanger 70 on the liquid chamber Z6 for controlling the temperature of the liquid chamber Z6. This may be required in instances where the apparatus is utilized in a hot environment in order to prevent the liquid from heating to a temperature where the foaming agent might become actuated.

Referring to FIG. 2, an isolation line 65, which is pressurized, isolates the heat sensitive resin in the heated resin meter Z5 and extends to a pressure switch 32. A pressure switch 32 is also associated with the chamber Z6.

Liquid injector valve 71 directs the liquid into the center of the base material from chamber Z5 through a spring loaded valve. An 0-ring seal 72 seats against the seal 73 of the injector to and in preventing the base material from flowing into the injector 71. When the liquid is being delivered from chamber Z1 injector 71 opens and the liquid flows into the center of the base material being delivered from chamber Z5.

The injector valve is positioned such that the tip 74 is adjacent the first portion of the mixer Z10. In this matter, overheating of the liquid is prevented which can result in premature foaming of the liquid material is obviated. Premature faoming will result in a non-homogenous foam product.

Referring to FIG. 1, an operated gun stroke adjuster 66 adjusts the opening of the nozzle orifice of the gun to maintain proper pressure and bead shape. An isolater block 68 isolates the heated gun Z14 from the mounting structure to prevent heat loss from the gun Z14 when it is attached to a support. The nozzle 69 preferably comprises a shaped orifice nozzle with intergral shut-off seat to minimize and eliminate the expansion of foam out of the nozzle tip after the gun is shut off.

Preferably, an electric brake 70 is associated with the motor 40 to assure proper positioning of the rods 36, 38. The motor 40 is accurately controlled so that it rotates at a constant rate.

The line Z2, extending from the pump Z1 to the chamber Z5 of metering device M for the base material is maintained at a temperature above the melting point of the base material. The line Z4, from the liquid pump Z3 to the chambers Z6 of metering device M is maintained at a predetermined elevated temperature above ambient. The metering chambers Z5, Z6 are heated to maintain substantially the corresponding temperatures of the material in the chambers. The mixer block Z9 and mixer Z10 are heated to maintain the mixed material at an elevated temperature above the melting point of the base material. Line Z11 extending from the mixer Z10 to the heat conditioning Z12 is heated to maintain the mixture a temperature at about the temperature of the melting point of the base material. Line Z13 is heated to maintain the temperature of the mixture at a lower temperature, but substantially above the melting point of the mixture. Similarly the gun 60 is maintained at such a lower temperature as is the isolation zone Z15 of the gun. The gun Z16 itself is heated adjacent the nozzle at Z16 to reheat the product as it approaches the outlet of the gun.

The base material and liquid material supply pumps, Z1 and Z3 are normally of the reciprocating type, but can be gear type and may be single or dual, such as for purposes of automatic pump change crossover.

Inlet valves V1, V2 are preferably solenoid operated and are opened and closed simultaneously to permit the base material and liquid material to enter the metering chambers Z5, Z6. Outlet valves V3, V4 are preferably solenoid operated and are opened and closed simultaneously to permit the metering of material out of metering chambers Z5, Z6 at the appropriate times. The valves for delivering, metering and dispensing devices are constructed and arranged to be operated in intermittent fashion.

The metering chambers Z5, Z6 are shown as being of the piston rod type controlled by electric motor 40 driving through ball screw 42 to force the pistons into the chambers and thereby dispensing predetermined quantities of the base material and liquid material as are required in the ratio desired. The control of the ratio is achieved by the size of the respective pistons 36, 38, for example, a ratio of ten parts of base material to one part of liquid material.

The heat conditioning device Z12 is provided with well-known controlled circuitry whereby it can be utilized, as presently described, and function to rapidly change the temperature of the mixture flowing between lines Z11 and Z13. The heat conditioning device Z12 permits the product to be dispensed at more frequent intervals than if the product passing from line Z11 to line Z13 did not have such a temperature reduced sufficiently in the absence of a heat exchanger.

The base material is generally available in 5 gallon pails and 55 gallon drums. The agent or liquid material is generally available in 5 gallon pails.

The base material device 20 preferably has a heated platen, to lower the viscosity of the base material, and a heated reciprocating pump to deliver the base material under a specific pressure to the meter.

The platen of the liquid material pump, Z3 delivers the liquid under a specific pressure to the metering chamber Z6. It is generally unheated for low flow requirements but is preferably heated for optimium high flow requirements. Excessive heating causes degrading of the liquid and temperature cycling of the liquid at the meter and beyond can cause degrading of the mix quality. Accordingly, it is preferred that the liquid temperature be controlled above ambient.

The base material and liquid material transfer hoses may be in lengths varying from 5 to 20 feet, or more, and be accompanied or replaced by a rigid, heated and insulated, pipeheader system. Furthermore, a central automated supply station of base material and liquid material pumps may be utilized to feed single or multiple meter systems.

The metering apparatus M may have, for example, a 10:1 ratio of base material to liquid material designed to deliver an uninterrupted continuous flow of the two metered fluids to the mixer block Z9 up to the maximum chamber size. After the base material and liquid material in the chambers Z5, Z6 are dispensed by a plurality of discharges or a single discharge, the chambers are reloaded.

On the reload stroke, the ball screw is operated to retract the rods 36, 38 and the system valves V1, V2 are opened to allow the supply fluid to reload the metering chambers Z5, Z6. When the chambers are loaded, the system valves V1, V2 close and the motor 40 operates to move rods 36, 38 and pressurize the fluid system to a specified pressure. On the dispense stroke, the system valves V3, V4 open to allow the metered fluid to flow to the mixer block Z9 and then dispense through the system onto the substrates. The metering apparatus M will deliver any incremental volume up to its maximum capacity as determined by the size as desired of the chambers Z5, Z6.

The drive of the metering apparatus M, although normally electric, may be pneumatic or hydraulic and may be operated through the use of ball screws or direct drive cylinders. The drive is preferably not fastened to the shot meter cylinder rods 36, 38 which are allowed to reload independently by the fluid pressure from supply pump Z1. The shot volume design is variable and dependent on the substrate design. The meter ratio is fixed, yet can be varied by design which is dependent upon the base material-liquid material ratio formulation by volume.

The metering system design preferably incorporates the use of shot metering rods for interrupted flow production where positive displacement of the base-liquid material fluids are desired. However, other metering systems may be utilized for continuous flow as well as interrupted flow production by using gear style meters or reciprocating cylinder meters The selection of these other designs is dependent on production requirements, type of automation selected and placement point of the metering system of the total production system.

The extension hose diameters and lengths are selected to provide closely balanced fluid pressures between the base material and liquid material fluids and to accommodate the desired fluid flow rate onto the substrate.

The heated mixer, Z10, is preferably a metal motionless mixing tube having a series of mixing elements to blend the base material and liquid material into a homogenous state. The increase in temperature assists in triggering the foaming process. The diameter of the mixing tube is dependent upon the production flow rate. The number of mix elements is depended upon the base-liquid material formulations and the production flow rate.

The hot foam from mixer Z10 enters a high heat transfer hose, Z11, where the temperature assists in the foaming process. The volume of this zone is critical and is varied by the hose diameter and hose length. The resultant residence time design controls foam quality and is dependent upon the base-liquid material formulations. The hose may be replaced or accompanied by a rigid piped heated header system.

When production rates exceed a specified level whereby the flow rate is high enough to prevent enough residence time of the foamed fluids in the low heat zone Z13 to achieve the desired characteristics of the foam, the heat conditioning apparatus Z12, is utilized to remove heat from the hot foam exiting Z11, and assist in dropping the foam temperature to the lower heat temperature. The hot foam temperature exiting the heat conditioning apparatus is preferably controlled by a sensor-controlled proportioning valve V11 which regulates the cooling fluid flow through the heat exchanger. The heat exchanger may utilize water-gylcol or freon as a cooling medium for high flow rate production requirements.

The hot foam then enters low heat transfer hose, Z13, where the temperature conditions and maintains foam quality and longevity before being dispensed onto the substrate. This zone conditions the foam by lowering, or when a heat conditioning apparatus is utilized, maintaining a lowered hot foam temperature near the fluid melt point. This conditioning process prevents degrading of the hot foam. This design increases foam quality and longevity. The volume of this transfer hose is designed to prevent the high heat fluid from entering the nozzle Z16 until it has been lowered to the low heat temperature range. The hose may be replaced or accompanied by a rigid heated piped header system. At any point along the fluid path of the foam control zone, between the mixer outlet and the dispense valve inlet, the fluid path may be branched to feed more than one dispense valve.

The conditioned hot foam then enters the heated dispense valve, Z14, where the temperature is generally the same as the low heat transfer hose, Z13. This valve opens during dispense and allows the hot foam to enter the heated nozzle and is closed at the end of the dispense cycle. The dispense valve is preferably a base-seal shut-off design whereby the valve stem retracts to dispense.

The dispensing valve is preferably operated by a double acting air actuator. The actuator may also be spring operated to assist in closing the valve in the event of a loss in power. The actuator is generally operated by 4-way solenoid operated pneumatic valve.

Another design that may be used includes a snuffer style valve whereby the valve stem retracts to stop the dispense cycle. The retracting stem causes the hot foam to retract, or snuff, back into the nozzle orifice. Another design what may be used includes a ball valve whereby the stem rotates a ball with an orifice to allow the hot foam to pass through the valve during dispense and stops the flow at the end of the dispense cycle. Another design includes manually operated heated dispense valve generally in the form of a heated pistol grip flow gun. The flow gun is generally of a base or tip seal design.

The heated dispense valve is separated from the heated nozzle by an insulating zone, Z15. The purpose of the insulating zone Z15 is to prevent the transfer of heat between zones Z14 and Z16. Without this insulator zone, the dispense valve may increase in temperature out of acceptable range. Likewise, without this insulator, the nozzle may decrease in temperature out of its acceptable range. The insulator zone is generally of a design where the nozzle is placed at a specified distance from the dispense valve having as little physical contact as possible between zones Z14 and Z16. The insulator medium may comprise air or low mass and low thermal transfer materials.

The conditioned hot foam then enters the high heat heated nozzle, Z16, where the increased temperature increases the hot foam temperature to give the foam its final foaming temperature in order to achieve a high quality foam product The high heat nozzle also lowers the viscosity of the foam surface to increase adhesion of the hot foam to the substrate.

In the case of a base-seal dispense valve whereby the sealing stem protrudes into the heated nozzle to start and stop the flow of hot foam, the orifice of the high heat nozzle generally is designed to accept a shaped orifice nozzle. This shaped orifice nozzle is generally threaded into the high heat nozzle and has an orifice to shape the hot foam and to place it onto the substrate. Short shaped orifice nozzles are generally not heated and are made of a high heat transfer material Additional long nozzle extensions may be heated to a specified temperature to maintain a high quality hot foam product.

It has been found that pressures are critical to the method and apparatus. More specifically, the meter outlet pressures prior to dispensing should be the same or substantially the same as during dispensing. In addition the pressures of the two components, namely the base material and the liquid foaming composition should be balanced preferably within one hundred p.s.i. In the overall system, pressure should preferably be as low as possible in order to provide high flow rates. In connection with the after mentioned elastomeric compositions, a system pressure of 1000 p.s.i. to 2000 p.s.i. have been found to produce satisfactory results.

Further in accordance with the invention it has been found that flow rates are critical in order to make consistent and uniform sealant products. Thus the speed of the motor that operates the metering devices Z5, Z6 is controlled at a precise rate with minimal tolerance (0–2000 RPM +/−3) so that a specific flow rate will occur when the valves V3, V4 are open and the metering devices are operated. Further, it has been found that a dispense delayed timer should preferably be used so that the valve of the dispensing gun is not opened until a short interval after the dispense signal is received or starting for opening and closing the appropriate valves and for energizing the motor of the metering device. It has also been found that residence time is critical. A minimum time is necessary in the high heat zone Z11 on the order of two minutes in the case of the elastomeric composition, identified below, as well as in the low heat zone Z12 on the order of one to two minutes, preferably two minutes. Maximum residence time is less critical. It has been found that the maximum residence time can be as high as one hour in the case of the below identified elastomeric composition without any undesirable degrading thereof.

Likewise, it has been determined that temperatures are very critical. Generally the base material is heated above its melting point for delivery to the mixer Z10, and the liquid material is heated above ambient for delivery to the mixer. Thereafter, the mixture is conditioned at a temperature above the melting point of the base material and thereafter to a lower. The mixture is then reheated to a temperature above the melting point of the base material immediately prior to dispensing.

The method and apparatus is applicable to various foaming compositions wherein an elastomeric base composition is mixed with a liquid containing an agent which functions upon mixing of the base composition and the liquid composition to produce a foamed elastomeric composition. A typical composition which can be used is that disclosed in the U.S. Pat. No. 4,677,133 wherein in the elastomeric composition comprises a mixture of two thermoplastic rubber compounds, at least one of which has a vinyl aromatic component and a higher aromaticity than the other rubber compound, an unstable resin which is oxidized or thermally decomposed as the foam product is cured and a liquid containing the foaming agent For purposes of clarity, the method and apparatus embodying the invention are correlated to such a composition in describing typical temperatures or controlling the method and apparatus. U.S. Pat. No. 4,677,133 is incorporated herein the reference. Satisfactory results can be achieved utilizing such a foaming composition at temperature ranges outlined below.

| Z1 | 410° F. +/− 25° | Z9 | 370° F. to 450° F. |
| Z2 | 405° F. +/− 20° | Z10 | 370° F. to 450° F. |
| Z3 | 80° F. +/− 30° | Z11 | 350° F. to 450° F. |
| Z4 | 80° F. +/− 30° | Z12 | 250° F. to 400° F. |
| Z5 | 395° F. +/− 20° | Z13 | 250° F. to 450° F. |
| Z6 | 110° F. +/− 25° | Z14 | 250° F. to 450° F. |
| Z7 | 395° F. +/− 20° | Z15 | 250° F. to 400° F. |
| Z8 | 110° F. +/− 25° | Z16 | 300° F. to 450° F. |

EXAMPLE

A composition as disclosed in the U.S. Pat. No. 4,677,133 was utilized wherein an elastomeric composition comprising a mixture of two thermoplastic rubber compounds, at least one of which is a vinyl aromatic compound and a higher aromaticity than the other rubber compound, an unstable resin which is oxidized or thermally decomposed as the foam product is cured and a liquid containing a heat actuated foaming agent. More specifically, the base material was a mixture of two thermoplastic rubber compounds wherein one was a styrene-ethylene/butylene-styrene triblock copolymer and the other was a styrene-ethylene/propylene diblock copolymer. The liquid material was a unstable resin comprising a mixture of aliphatic hydracarbon resins, and aromatic hydrocarbon resins.

The base material was heated utilizing a pump, Z1, having a heated platen, to a temperature of 410° for delivering to a meter chamber Z5. The heated hose Z2, extending between the base material pump and the meter chamber Z5 as heated to 405° F. while the base material was being transferred. The liquid material was delivered at 80° F. by a pumping unit, Z3. The liquid material was applied under pressure to the liquid meter chamber Z6 through a heated transfer hose Z4, such that the temperature of the liquid material was maintained at 110° F. The base material and the liquid material meter chambers Z5, Z6 were heated to maintain the temperature of the base material at 395° F. and the liquid material at 80° F. The mixing block Z9 was heated so as to maintain the temperature of the two combined materials at 400° F. From the mixing block Z9, the mixture was advanced through a motionless mixer Z10 which was heated so as to maintain the temperature of the mixture at 405° F. From the motionless mixer Z10, the mixture was advanced to a heat exchanger through line Z11 so as to maintain the mixture at a temperature of 370° F. The heat conditioning device Z12 was operated so as to reduce the temperature of the mixture to 275° F. The mixture was then advanced to dispensing valve Z14 through line Z13 heated to maintain the mixture at 275° F. The dispensing valve Z14 was also heated to maintain the temperature of the material entering the valve at 275° F. From the dispensing valve Z14, the material was advanced to an insulated zone Z15 being heated to maintain the temperature of the mixture at 275° F. From the insulated zone Z15, the mixture was advanced to a discharge nozzle Z16 which was heated to elevate and maintain the material discharging from the nozzle at 350° F. The method and apparatus so operated produced a uniform consistent and repetitively formed product.

It can thus be seen that there has been provided an improved method and apparatus which permits the formation of a foam product such as a sealant in a uniform consistent and repetitive fashion; which maximizes the foaming action; whereina the sealant has predetermined durometer and tensile strength; wherein the sealant will maintain a predetermined shape and cross section; which provides a sealant that will have a good foam bond with a substrate; which is substantially less costly than cut gaskets and seals; which permit the intermittent dispensing of the product; and which will permit the same apparatus to be readily adjusted for utilizing materials of different compositions.

As contrasted to die-cut gaskets, the present invention eliminates the manufacture of gasketing materials as found in the converting industry, eliminates manufacture of dies needed for each shaped part, eliminates labor of die cutting and warehousing, and eliminates the need for bonding gasket material to part. As contrasted to PVC foam methods, the present invention eliminates the need for heated curing ovens and natural gas expense and decreases overall production time over PVC. As contrasted to polyurethane foam, the present invention eliminates toxicity problems of urethane (i.e. free isocyanates), eliminates need for solvent cleaning and associated waste product reclamation and disposal, and has a shorter (i.e. 1 min.) production time than polyurethane foam (i.e. 15 min.). As contrasted to gas foamed thermoplastic such as shown in U.S. Pat. No. 4,059,714, the present invention eliminates the need for mixing a gas and the associated apparatus control problems.

Referring to FIG. 3, when the meter is placed as near to the point of dispense as practical and the mixer and gun assembly cannot be lengthened enough to accommodate the design of the production system, heated extension hoses, Z7 and Z8, are utilized to transfer the metered base material and liquid material fluids to the mixer, block Z9 and mixer Z10. The temperatures of the material in lines Z7 and Z8 are generally the same as Z5 and Z6 respectively.

The mixer block Z9 includes check valves V8, V9 to prevent backflow of fluids and to prevent one component from traveling into the flow path of the other. As in FIG. 1, the mixer block Z9 is designed to inject, during dispense, the liquid material into the center of the area of flow of the base material component before exiting the mix manifold. When the heated extension hoses are not utilized the inlet valves V6, V7 to the mix manifold, and in some circumstances the check valves V8, V9, may be eliminated, as shown in FIG. 1.

I claim:

1. A method for dispensing a foam product wherein an elastomeric base material, which is solid at ambient temperatures, and a liquid material containing a heat actuated foaming agent are combined to form the foam product, comprising
   heating the base material to melt the material,
   metering simultaneously portions of the base material and liquid material,
   mixing the portions,
   thereafter conditioning the mixture at a temperature above the melting temperature of the base material,
   subsequently conditioning the mixture to a lower temperature before dispensing; and
   dispensing the mixture,
   heating the liquid material to maintain the liquid at an elevated temperature above ambient,
   reheating the mixture to substantially the melting temperature of the base material just prior to the dispensing.

2. The method set forth in claim 1 including the step of insulating the portion being reheated prior to dispensing from the portion of the mixture up stream.

3. The method set forth in claim 1 wherein the steps of mixing, advancing and dispensing the mixture are accomplished by intermittently metering devices and dispensing.

4. The method set forth in claim 3 including the step of initiating the operation of the metering step prior to opening the outlet of the dispensing gun.

5. The method set forth in claim 1 wherein said step of conditioning is accomplished by advancing said mixture through a heat conditioning device.

6. The method set forth in claim 1 including the steps of providing heated lines between a source of the base material and the liquid material to a metering device for metering the materials, providing a heated line between the mixing device and a heat conditioning device, providing a heated line between a heat exchanger and a gun for dispensing and controlling the temperatures in said lines from the metering device prior to dispensing and during dispensing such that they are substantially the same.

7. The method set forth in claim 6 including the step of directing the liquid material and base material directly into the mixing device.

8. The method set forth in claim 6 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the line between the mixing device and the heat conditioning device in a range of about 345° F. to about 400° F., and maintaining the temperature in the line between the heat conditioning device and the gun in a range of about 255° F. to about 295° F.

9. The method set forth in claim 1 providing heated lines between the metering devices for metering the portions and a mixing device.

10. The method set forth in claim 6 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the base material and liquid lines between the metering device and the mixing device in a range of about 380° F. to about 420° F. and in a range of about 80° F. to about 120° F. respectively, maintaining the temperature in the line between the mixing device and the heat conditioning device in a range of about 345° F. to about 400° F., and maintaining the temperature in the line between the heat conditioning device and the gun in a range of about 255° F. to about 295° F.

11. The method set forth in claim 1 including the step of controlling the rate of dispensing such that the rate is at a predetermined rate.

12. The method set forth in claim 1 including the step of providing a base material comprising a mixture of two thermoplastic rubber compounds and said liquid material comprises a blowing agent.

13. The method set forth in claim 12 wherein at least one said compounds of which is a vinyl aromatic compound and a higher aromaticity than the other rubber compound, and the step of providing liquid material comprising an unstable resin and foaming agent.

14. The method set forth in claim 12 including the steps of providing heated lines between a source of the base material and the liquid material to a metering device for metering the materials, providing heated lines between the metering devices for metering the portions and a mixing device, providing a heated line between the mixing device and a heat conditioning device, providing a line between a heat exchanger and a gun for dispensing and controlling the temperatures in said lines from the metering device prior to dispensing and during dispensing such that they are substantially the same.

15. The method set forth in claim 14 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the line between the mixing device and the heat conditioning device in a range of about 345° F. to about 400° F., and maintaining the temperature in the line between the heat conditioning device and the gun in a range of about 255° F. to about 295° F.

16. The method set forth in claim 14 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the base material and liquid lines between the metering device and the mixing device in a range of about 380° F. to about 420° F. and in a range of about 80° F. to about 120° F. respectively, maintaining the temperature in the line between the mixing device and the heat conditioning device in a range of about 345° F. to about 400° F., and maintaining the temperature in the line between the heat conditioning device and the gun in a range of about 255° F. to about 295° F.

17. A method of forming and applying a foam product by combining an elastomeric base material which is solid at ambient temperatures and a liquid material containing a heat actuated foaming agent which is liquid at ambient temperatures, and contains a foaming agent which chemically reacts at a predetermined temperature to form a foam, the improvement comprising heating the base material until it is liquid and to a predetermined temperature which is substantially the temperature of the foam product which is to be formed, heating the liquid material to a temperature above ambient, delivering the heated molten base material through a first line to a first heated metering chamber which is at substantially said predetermined temperature, heating the first line to maintain the temperature of the base material in the first line at substantially said predetermined temperature, delivering the liquid material through a second line to a second heated metering chamber while maintaining the temperature of the liquid material at a predetermined temperature above ambient, causing the base material and the liquid material to be thoroughly mixed and chemically react in a mixing device, maintaining the pressure of the mixed materials in the mixing device, heating the mixed materials in the mixing device to maintain the temperature of the mixture at substantially said predetermined temperature, delivering the mixed materials through a third line at a predetermined temperature corresponding substantially to the temperature of the mixing device, thereafter delivering the mixed materials from the third through a fourth line to a dispensing nozzle while maintaining the temperature of the materials in the fourth line at a temperature lower than the temperature of the mixed materials in the third line, and dispensing the mixed materials by operation of the dispensing nozzle.

18. The method set forth in claim 17 including the step of directing the liquid material and base material directly into the mixing device.

19. The method set forth in claim 17 further including directing said base material and said liquid material through a center mixing block prior to passage to the mixing device.

20. The method set forth in claim 17 further including providing a heat conditioning device between said fifth and sixth lines for lowering the temperature of the mixture in said fourth line.

21. The method of claim 17 further including providing a heated gun nozzle for elevating the temperature of the mixture immediately prior to dispensing to substantially the temperature of the mixture in the fourth line.

22. The method of claim 21 further including thermally insulating said heated nozzle from said fourth line.

23. The method set forth in claim 17 including the step of initiating the metering step prior to the dispensing step.

24. The method set forth in claim 17 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the line between the mixing device and the heat conditioning device in a range of about 345° F. to about 400° F., and maintaining the temperature in the line between the heat conditioning device and the gun in a range of about 255° F. to about 295° F.

25. The method set forth in claim 17 including periodically delivering base material from the first chamber through a fifth line to the mixing device,
maintaining the temperature of the material in the fifth line at substantially the predetermined temperature,
periodically delivering the liquid material from the second chamber through a sixth line to the mixing device substantially simultaneously as the delivery of the base material to a mixing device and in an amount proportional to the amount of base material while maintaining substantially the predetermined temperature of said liquid material.

26. The method set forth in claim 25 including maintaining the temperature of said first line between the source of the base material and the metering device in a range of about 380° F. to about 420° F., maintaining the temperature in the second line between the source of the liquid material and the metering device in a range of about 80° F. to about 120° F., maintaining the temperature in the base fifth line and sixth lines between the metering device and the mixing device in a range of about 380° F. to about 420° F. and in a range of about 80° F. to about 120° F. respectively, maintaining the temperature in the third line between the mixing device and the heat conditioning device in a range of about 345° F. to about 400° F., and maintaining the temperature in the fourth line between the heat conditioning device and the gun in a range of about 255° F. to about 295° F.

27. The method set forth in claim 17 including the step of controlling the rate of dispensing such that the rate is at a predetermined rate.

28. The method set forth in claim 17 including the step of providing a base material comprising a mixture of two thermoplastic rubber compounds, at least one of which is a vinyl aromatic compound and a higher aromaticity than the other rubber compound, and the step of providing liquid material comprising an unstable resin and foaming agent.

29. The method set forth in claim 28 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the line between the mixing device and the heat conditioning device in a range of about 345° F. to about 400° F., and maintaining the temperature in the line between the heat conditioning device and the gun in a range of about 255° F. to about 295° F.

30. The method set forth in claim 28 including maintaining the temperature of said line between the source of the base material and the metering device in a range of about 380° F. to about 420° F., maintaining the temperature in the line between the source of the liquid material and the metering device in a range of about 80° F. to about 120° F., maintaining the temperature in the base material and liquid lines between the metering device and the mixing device in a range of about 380° F. to about 420° F. and in a range of about 80° F. to about 120° F. respectively, maintaining the temperature in the line between the mixing device and the heat conditioning device in a range of about 345° F. to about 400° F., and maintaining the temperature in the line between the heat conditioning device and the gun in a range of about 255° F. to about 295° F.

31. An apparatus for dispensing a foam product wherein an elastomeric base material, which is solid at ambient temperature, and a liquid material containing a heat actuated foaming agent are combined to form the foam product, which comprises:
means for providing a heated base material,
means for providing a liquid material,
means for mixing said heated material and said liquid material in predetermined metered portions,
means for thereafter conditioning the mixture at a temperature above the melting point of said composition and means for subsequently conditioning said mixture to a temperature below the melting point of said composition, and
a dispensing means, and
means for delivering said conditioned mixture to said dispensing means.

32. The apparatus set forth in claim 31 including means for heating and maintaining the liquid material at an elevated temperature above ambient.

33. The apparatus set forth in claim 31 including a means for reheating mixture to about the melting point of the composition immediately prior to dispensing.

34. The apparatus set forth in claim 31 including a means for insulating the reheating means from the portion of the mixture up stream.

35. The apparatus of claim 34 including a means for intermittently operating said metering and dispensing means.

36. The apparatus of claim 31 wherein said means for delivering said base and liquid material comprises heated metering chambers for said base material and liquid material, respectively, a piston rod received in each metering chamber, an electric motor, a ball screw driven by said motor for forcing the piston rod into the chambers and thereby dispensing predetermined quantities of the base and liquid material in a ratio required dependent upon the respective piston sizes.

37. The apparatus set forth in claim 31 wherein said means for mixing said portions comprises a mixing block for injecting the liquid material into the center of the area of flow of the base material and a motionless mixer.

38. The apparatus of claim 31 wherein said means for conditioning the mixture comprises a heat conditioning device.

39. The apparatus of claim 31 wherein said means of dispensing comprises a dispensing gun.

40. The apparatus of claim 39 wherein said a dispensing gun had a heated nozzle, and means defining an insulated zone up stream of said heated nozzle.

41. The apparatus set forth in claim 39 wherein said means defining said insulating zone is an insulator medium selected from the group consisting of air, low mass and low thermal transfer materials.

42. The apparatus set forth in claim 31 including valves controlling flow into and out of said metering chamber, said valves being mounted directly on said metering chambers.

43. The apparatus set forth in claim 42 wherein said mixing device is mounted directly on one of said metering chambers.

44. The apparatus set forth in claim 31 including means for separately directing said base material and liquid material directly into said means for mixing.

45. An apparatus for forming and applying a foam product by combining an elastomeric base material which is solid at ambient temperatures and a liquid material containing a heat actuated foaming agent which is liquid at ambient temperatures, and contains a foaming agent which chemically reacts at a predetermined temperature to form a foam, the improvement comprising
- means for heating the base material until it is liquid and to a predetermined temperature which is substantially the temperature of the foam product which is to be formed and at a temperature at which a liquid material will chemically react with the base material,
- a first heated metering chamber,
- a first heated line for delivering the heated molten base material to said first heated metering chamber which is at substantially said predetermined temperature,
- means for heating the first line to maintain the temperature of the base material in the first line at substantially said predetermined temperature,
- a second heated metering chamber,
- a second heated line for delivering the liquid to said second metering chamber while maintaining the temperature of the liquid material at a predetermined temperature above ambient,
- a mixing device,
- a heated mixing device for mixing the base material and the liquid material,
- means for maintaining the pressure of the mixed materials in the mixing device,
- means for heating the mixed materials in the mixing device to maintain the temperature of the mixture at substantially said predetermined temperature,
- a dispensing gun,
- a third heated line for delivering the mixed materials from the mixing device at a predetermined temperature corresponding substantially to the temperature of the mixing device,
- a fourth heated line for receiving the mixed materials from the third line and thereafter delivering the mixed materials to said dispensing gun,
- and means for maintaining the temperature of the materials in the fourth heated line at a temperature lower than the temperature of the mixed materials in the third line.

46. The apparatus set forth in claim 45 including a mixing block for directing said liquid material into the center of the area of flow of the base material prior to entry into the mixing device.

47. The apparatus set forth in claim 46 including a pressurized heat conditioning device between said third and fourth lines for lowering the temperature of the mixture in said fourth line.

48. The apparatus of claim 47 wherein said dispensing device includes gun nozzle and a heating means for the nozzle to elevate the temperature of the mixture immediately prior to dispensing to substantially the temperature of the mixture in the fourth line.

49. The apparatus of claim 48 including a means for thermally insulating said heated nozzle from said fourth line.

50. The apparatus set forth in claim 45 including inlet valves to the metering chamber for the base material and the metering chamber for liquid material, respectively, outlet valves from the metering chamber for the base material and metering chamber for the liquid material, respectively, said inlet valves being operated simultaneously and said outlet valves being operated simultaneously.

51. The apparatus set forth in claim 50 wherein said valves are mounted directly on said metering chambers.

52. The apparatus set forth in claim 51 wherein said mixing device is mounted directly on one of said outlet valves.

53. The apparatus set forth in claim 45 including means for maintaining the temperature of said first line between the source of the base material and the metering device in a range of about 380° F. to about 420° F., maintaining the temperature in the second line between the source of the liquid material and the metering device in a range of about 80° F. to about 120° F., maintaining the temperature in the third line between the mixing device and the heat conditioning device in a range of about 345° F. to about 400° F., and maintaining the temperature in the fourth line between the heat conditioning device and the gun in a range of about 255° F. to about 295° F.

54. The apparatus set forth in claim 45 including a fifth heated line for periodically delivering base material from the first chamber to said mixing device,
- means for maintaining the temperature of the material in the fifth heated line at substantially the predetermined temperature,
- a sixth heated line for periodically delivering the liquid material from the second chamber to said mixing device, substantially simultaneously as the delivery of the base material to said mixing device and in an amount proportional to the amount of base material while maintaining substantially the predetermined temperature of said liquid material.

55. The apparatus set forth in claim 54 including means for maintaining the temperature of said first line between the source of the base material and the metering device in a range of about 380° F. to about 420° F., maintaining the temperature in the second line between the source of the liquid material and the metering device in a range of about 80° F. to about 120° F., maintaining the temperature in the third line between the mixing device and the heat conditioning device in a range of about 345° F. to about 400° F., and maintaining the temperature in the fourth line between the heat conditioning device and the gun in a range of about 255° F. to about 295° F.

56. The apparatus set forth in claim 45 including valves controlling flow into and out of said metering chamber, said valves being mounted directly on said metering chambers.

57. The apparatus set forth in claim 40 wherein said mixing device is mounted directly on one of said metering chambers.

58. The apparatus set forth in claim 45 wherein including an injector for directing said liquid material into said base material as the base material flows to said mixing device, said injector being positioned at the center of said mixing device.

59. The apparatus set forth in claim 45 including means for controlling the temperature of said liquid in said second heated chamber.

60. The apparatus set forth in claim 39 including heat exchanger means for cooling said chamber.

* * * * *